United States Patent
Rocher Pastor et al.

(10) Patent No.: US 10,759,512 B2
(45) Date of Patent: Sep. 1, 2020

(54) AIRCRAFT COMPOSITE PANEL ASSEMBLY AND MANUFACTURING METHOD THEREOF

(71) Applicant: Airbus Operations, S.L., Madrid (ES)

(72) Inventors: Miguel Ángel Rocher Pastor, Getafe (ES); Victor Tabernero Martínez, Getafe (ES)

(73) Assignee: Airbus Operations, S.L., Getafe (Madrid) (ES)

( * ) Notice: Subject to any disclaimer, the term of this patent is extended or adjusted under 35 U.S.C. 154(b) by 365 days.

(21) Appl. No.: 15/825,016

(22) Filed: Nov. 28, 2017

(65) Prior Publication Data
US 2018/0148154 A1    May 31, 2018

(30) Foreign Application Priority Data

Nov. 29, 2016  (EP) ...................... 16382569

(51) Int. Cl.

| | |
|---|---|
| *B32B 3/06* | (2006.01) |
| *B64C 1/12* | (2006.01) |
| *B32B 3/14* | (2006.01) |
| *B32B 25/10* | (2006.01) |
| *B64C 1/26* | (2006.01) |

(Continued)

(52) U.S. Cl.
CPC .............. *B64C 1/12* (2013.01); *B29D 99/001* (2013.01); *B32B 3/06* (2013.01); *B32B 3/14* (2013.01); *B32B 17/063* (2013.01); *B32B 25/10* (2013.01); *B64C 1/26* (2013.01); *B64C 3/26* (2013.01); *B64C 7/00* (2013.01); *B32B 2605/18* (2013.01); *B64C 5/02* (2013.01); *B64C 25/001* (2013.01);

(Continued)

(58) Field of Classification Search
CPC ............ Y10T 428/195; Y10T 428/197; B29C 66/1282; B29C 66/12841; B29C 66/12822; B32B 3/06; B32B 3/08; B64C 1/12; B64C 1/26; B64C 3/26; B64C 5/02; B64C 7/00; B64C 52/001; B64C 2001/0072; B29D 99/001
See application file for complete search history.

(56) References Cited

U.S. PATENT DOCUMENTS

| | | |
|---|---|---|
| 7,010,472 B1 | 3/2006 | Vasey-Glandon et al. |
| 2007/0200030 A1 | 8/2007 | McFarlane et al. |

FOREIGN PATENT DOCUMENTS

| | | |
|---|---|---|
| EP | 1504888 A1 | 2/2005 |
| EP | 2617645 A1 | 7/2013 |

(Continued)

OTHER PUBLICATIONS

Extended European Search Report for Application No. 16382569 dated May 11, 2017.

*Primary Examiner* — Alexander S Thomas
(74) *Attorney, Agent, or Firm* — Jenkins, Wilson & Taylor & Hunt, P.A.

(57) ABSTRACT

An aircraft composite panel assembly includes a first panel having upper and lower faces, the lower face having a recess on a first side of the panel, a second panel having upper and lower faces, the lower face having an outward projection at a first side of the panel, the outward projection received on the recess forming a lower continuous face; and a forward stack of plies of composite material bonded to the upper face of the first panel, the forward stack of plies having an edge overlapping the first side of the first panel, and the number of plies of the forward stack of plies decreasing toward the opposite side of the first side of the first panel.

15 Claims, 3 Drawing Sheets

(51) Int. Cl.
*B64C 7/00* (2006.01)
*B29D 99/00* (2010.01)
*B64C 3/26* (2006.01)
*B32B 17/06* (2006.01)
*B64C 5/02* (2006.01)
*B64C 25/00* (2006.01)
*B64C 1/00* (2006.01)

(52) U.S. Cl.
CPC ... *B64C 2001/0072* (2013.01); *Y10T 428/195* (2015.01); *Y10T 428/197* (2015.01)

(56) References Cited

FOREIGN PATENT DOCUMENTS

| WO | WO 2009/118548 A2 | 10/2009 |
| WO | WO 2011/148167 A2 | 12/2011 |

AIRCRAFT COMPOSITE PANEL ASSEMBLY AND MANUFACTURING METHOD THEREOF

CROSS-REFERENCE TO RELATED APPLICATION

This application claims the benefit of and priority to European patent application No. 1638259.8, filed on Nov. 29, 2016, the entire disclosure of which is incorporated by reference herein.

TECHNICAL FIELD

The present disclosure refers to a composite panel assembly for an aircraft, to be particularly used, for example, at interfaces between components that require seals for their attachment.

The disclosure herein also refers to a method for manufacturing a composite panel assembly for an aircraft.

BACKGROUND

Composite panels of an aircraft are traditionally assembled by seals. These seals are generally required at abrupt or perpendicular interfaces. The interface between the belly fairing and the wing is an example of these abrupt interfaces.

Seals conventionally installed on these interfaces suffer frequent problems of breakage and noise. The reason is that the extremities of these conventional seals (from panel to panel) bat during the flight.

FIG. 1 shows a conventional panel assembly, in which the extremities of the panels 12, 13 are visibly damaged.

Since the mentioned situation is unacceptable for an aircraft, some aircraft manufacturers have developed alternative solutions for assembling panels. One of these solutions includes providing glued seals between the panels to be assembled. Typically, one extreme of these seals is glued to the surface of one of the panels, and the other extreme is attached to the other panel.

FIG. 2a shows a cross-sectional view of a glued seal 14 provided for the assembly between two panels 15, 16. The figure shows a Y-seal 14 having one extreme attached to a first panel 15, and an opposite extreme glued to a second panel 16. The seal 14 is filled with glue 17.

Although glued seals are widely used, they also carry several drawbacks. One of the main drawbacks relates to maintainability. In the glued solution, maintenance workers need to graze the glue at the surface to uninstall the panel. This is a very hard task (that airlines shall do mandatorily for regular inspections) with high risk of damaging the structure.

FIG. 2b shows the panel 16 shown in FIG. 2a, in which the glued seal 14 has been removed. As shown, the panel 16 has glue 17 residues that have to be cleaned.

Further, glue is hard and difficult to apply. Also, it is not a reproducible solution (depending on the operator) and is very high time consuming.

In addition, glue involves a not negligible increase of weight, which can be around 14 kg.

Further, even applying the glued solution, there are some panels that still bat, generating noise and damage. To solve that, external plate parts are additionally installed, to stabilize the extremities of these problematic panels. These parts include aerodynamic (edges across to the airflow) and maintainability (needs to remove the part to uninstall one of the panels) penalties.

Regarding the installation of glued seals, it has to be noticed that panels have to be equipped with the seals, and installed one by one in the FAL (Final Assembly Line). The operator installs the panels first, and glues the seals to a panel surface. Afterwards he shall do an extra operation comprising or consisting of lifting the external lip of the seal and injecting the sealant (glue) to fill up the volume (see FIG. 2a) between lips of the seal. Once the volume is filled, sealant is getting out from the extremities and everything has to be cleaned.

Applying the glue is a long lasting task, considering the difficult access the operators have to the panel assemblies, since the application has to be done once everything is installed. Further, it is a manual and dirty operation, which shall be done not only one time in FAL to deliver the aircraft, but also in service by the airlines.

It would therefore be desirable to provide a technical approach that offers a solution for assembling panels that is capable of improving the performance, noise, maintenance and endurance of the conventional solutions.

SUMMARY

The present disclosure overcomes the above mentioned drawbacks by providing an aircraft composite panel assembly, an aircraft including the composite panel assembly, and a method for manufacturing a composite panel assembly for an aircraft, which provides a resistant and reliable assembly that definitely prevents panels from batting during the flight, at the same time that simplifies the installation and maintenance of the panels.

One object of the present disclosure is to provide a panel assembly that prevents panels from batting, removing the damage and noise present in traditional panel assemblies.

Another object of the disclosure herein is to provide a panel assembly that meets endurance and maintainability requirements, without the need of additional pieces that involve weight and aerodynamic penalties.

Another object of the disclosure herein is to provide a panel assembly compatible with the manufacturing conditions of composite structures, to be easily incorporated to the traditional manufacturing process.

One aspect of the present disclosure refers to a composite panel assembly for an aircraft that comprises a first panel, a second panel, and a forward stack of plies of composite material.

The first panel has upper and lower faces. The lower face has a recess on a first side of the panel. The second panel has upper and lower faces. The lower face has an outward projection at a first side of the panel. The outward projection is received on the recess of the first panel, forming a lower continuous face. This way, the first and second panels are assembled together offering continuous faces free of aerodynamic penalties.

The forward stack of plies of composite material is bonded to the upper face of the first panel. The forward stack of plies has an edge overlapping the first side of the first panel. Further, the number of plies of the forward stack of plies decreases toward the opposite side of the first side of the first panel.

Providing the stack of plies on the first side of the first panel, the disclosure herein reinforces the assembly between the first and second panels. This way, the disclosure herein offers a resistant and durable assembly, which apart from avoiding panels to bat during the flight, reduces the damage and noise associated to this batting.

Further, providing a decreasing number of plies toward the middle section of the first panel, the disclosure herein offers a smooth structural transition, sharing loads and avoiding damaging interface resistant components.

Additionally, the decreasing number of plies offers a smooth airflow transition that improves the aerodynamic behavior of conventional assemblies. This way, the air flow turbulences conventionally caused at the interfaces (especially at abrupt interfaces) are drastically reduced, resulting in a drag reduction in the aircraft.

In addition, since the forward stack of plies is only bonded to the upper face of the first panel, panels can be independently uninstalled, simplifying thus their installation and maintenance.

Also, the disclosure herein provides a clean interface between the panels, not requiring an extra work for the cleaning.

Further, the disclosure herein provides a weight efficient solution, avoiding the use of sealant products or additional pieces for reinforcing the assembly.

Another aspect of the disclosure herein refers to an aircraft comprising a landing gear door, a wing having a leading edge and a trailing edge, a horizontal tail plane having a leading edge and a trailing edge, a vertical tail plane having a leading edge and a trailing edge, a belly fairing, and a composite panel assembly as described, wherein at least part of the landing gear door, and/or the leading edge of the wing, and/or the trailing edge of the wing, and/or the leading edge of the horizontal tail plane, and/or the trailing edge of the horizontal tail plane, and/or the leading edge of the vertical tail plane, and/or the trailing edge of the vertical tail plane, and/or the belly fairing comprises the composite panel assembly.

Finally, another aspect of the disclosure herein refers to a method for manufacturing a composite panel assembly for an aircraft, comprising the steps of providing a first panel having upper and lower faces, providing a second panel having upper and lower faces, wherein the lower face of the second panel has an outward projection at a first side of the panel, and providing a forward stack of plies of composite material, wherein the forward stack of plies has an edge and a decreasing number of plies toward the opposite side of the edge.

Further, the method comprises providing a recess on a first side of the lower face of the first panel, and coupling the outward projection of the second panel with the recess of the first panel forming a lower continuous face, and bonding the forward stack of plies to the upper face of the first panel, such that the edge of the forward stack of plies overlaps the first side of the first panel.

The method of the disclosure herein is thus compatible with the conventional manufacture of composites, sharing manufacturing conditions, installation process and final assembly line. Thus, the method of the disclosure herein provides a simple and cost-effective way of producing composite panel assemblies.

BRIEF DESCRIPTION OF THE DRAWINGS

For a better comprehension of the disclosure herein, the following example drawings are provided for illustrative and non-limiting purposes, wherein:

FIG. 2a shows two panels attached by the glued seal. FIG. 2b shows one of the panels, once the glued seal has been retired.

FIG. 4 further shows a forward stack of plies and a rearward stack of plies, according to preferred embodiments.

DETAILED DESCRIPTION

FIG. 3 shows an aircraft composite panel assembly 10 according to a preferred embodiment. According to the disclosure herein, the composite panel assembly 10 comprises a first panel 1 having upper and lower faces, a second panel 2 having upper and lower faces, and a forward stack of plies 5 of composite material bonded to the upper face of the first panel 1.

Figure 1:
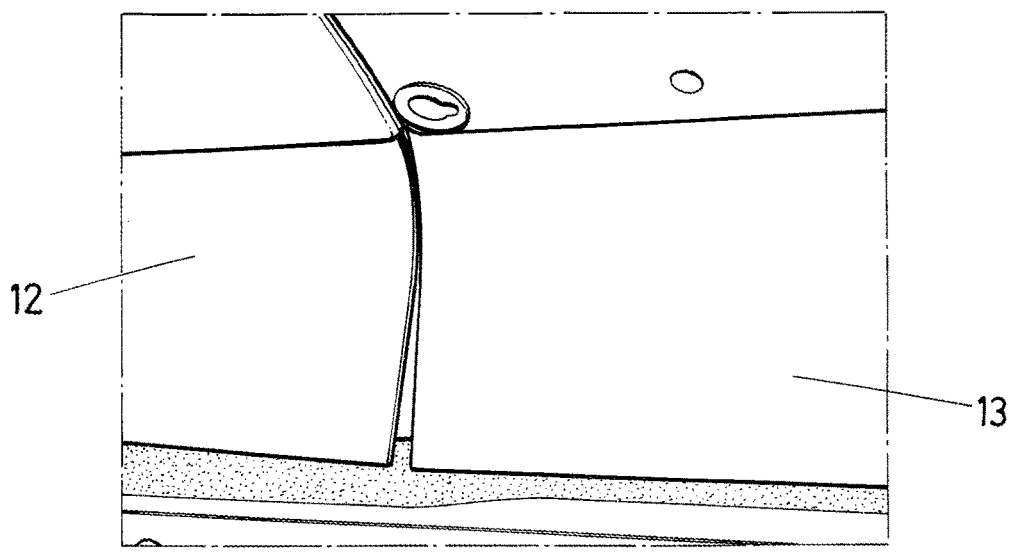
FIG. 1 shows a front view of a conventional composite panel assembly.
Figure 2A:
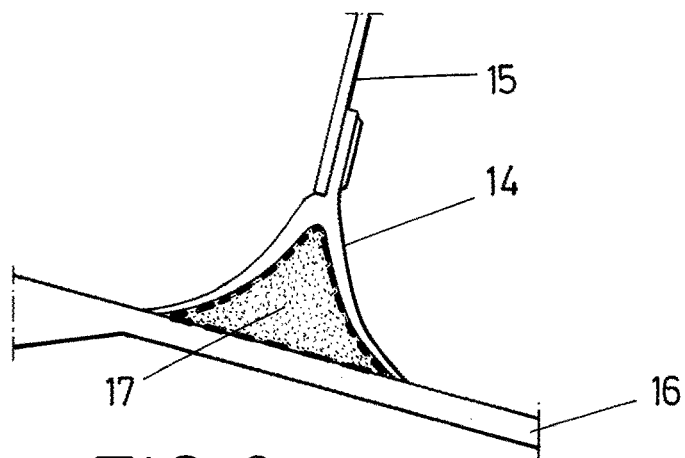
FIG. 2a-2b show respectively a cross-sectional view and a front view of the known glued seal solution for assembling panels.
Figure 2B:
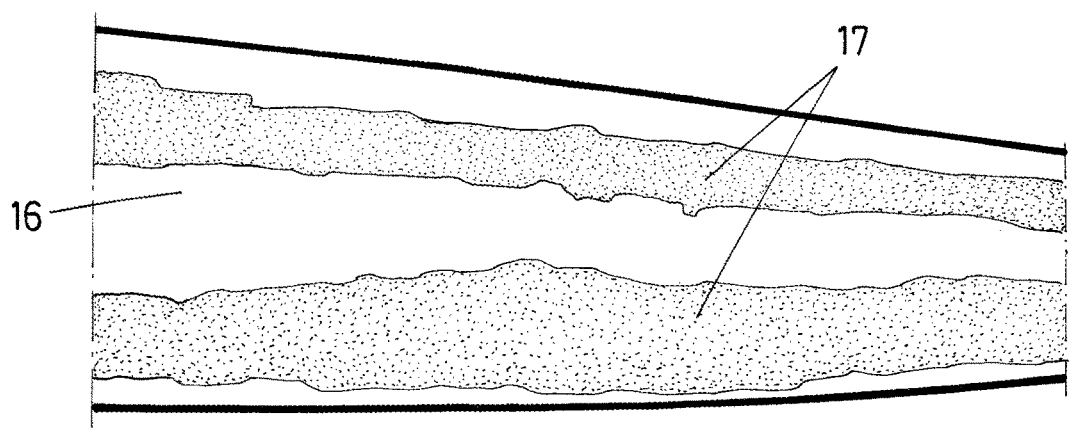
Figure 3A:
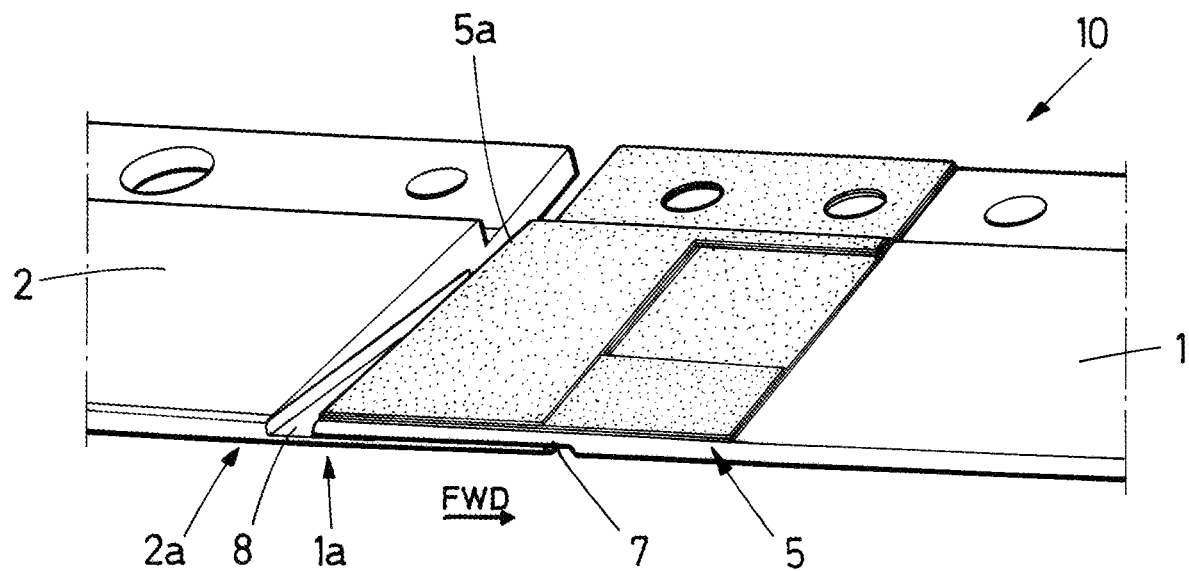
FIG. 3a-3b show respectively a front perspective view and a rear perspective view of a composite panel assembly, according to a first embodiment of the present disclosure.
Figure 3B:
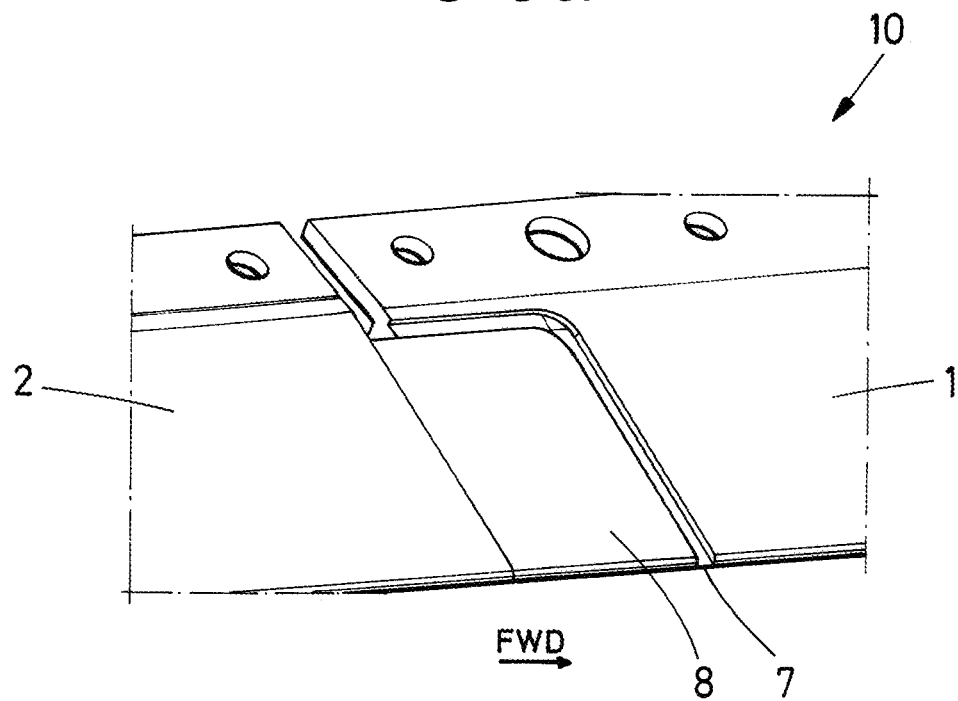

FIG. 3a shows the upper face of the first and second panels 1, 2, together with the forward stack of plies 5, and FIG. 3b shows the lower face of the first and second panels 1, 2.

As shown in FIGS. 3a and 3b, the lower face of the first panel 1 has a recess 7 on a first side 1a of the panel 1, and the second panel 2 has an outward projection 8 on a first side 2a of the panel 2, wherein the outward projection 8 is configured to be received on the recess 7 forming a lower continuous face.

To reinforce the assembly between the first and second panels 1, 2, a forward stack of plies 5 of composite material is bonded to the upper face of the first panel 1. As shown in FIG. 3a, the forward stack of plies 5 has an edge 5a overlapping the first side 1a of the first panel 1. With this positioning, in addition to provide reinforcement to the assembly, the disclosure herein allows that panels 1, 2 can be separately uninstalled. This way, the disclosure herein simplifies the installation and maintenance of conventional panel assemblies.

Further, the forward stack of plies 5 is formed by a decreasing number of plies toward the opposite side of the first side 1a of the first panel 1. This configuration improves the aerodynamic response of the assembly, reducing turbulences and drag in the aircraft.

Figure 4:
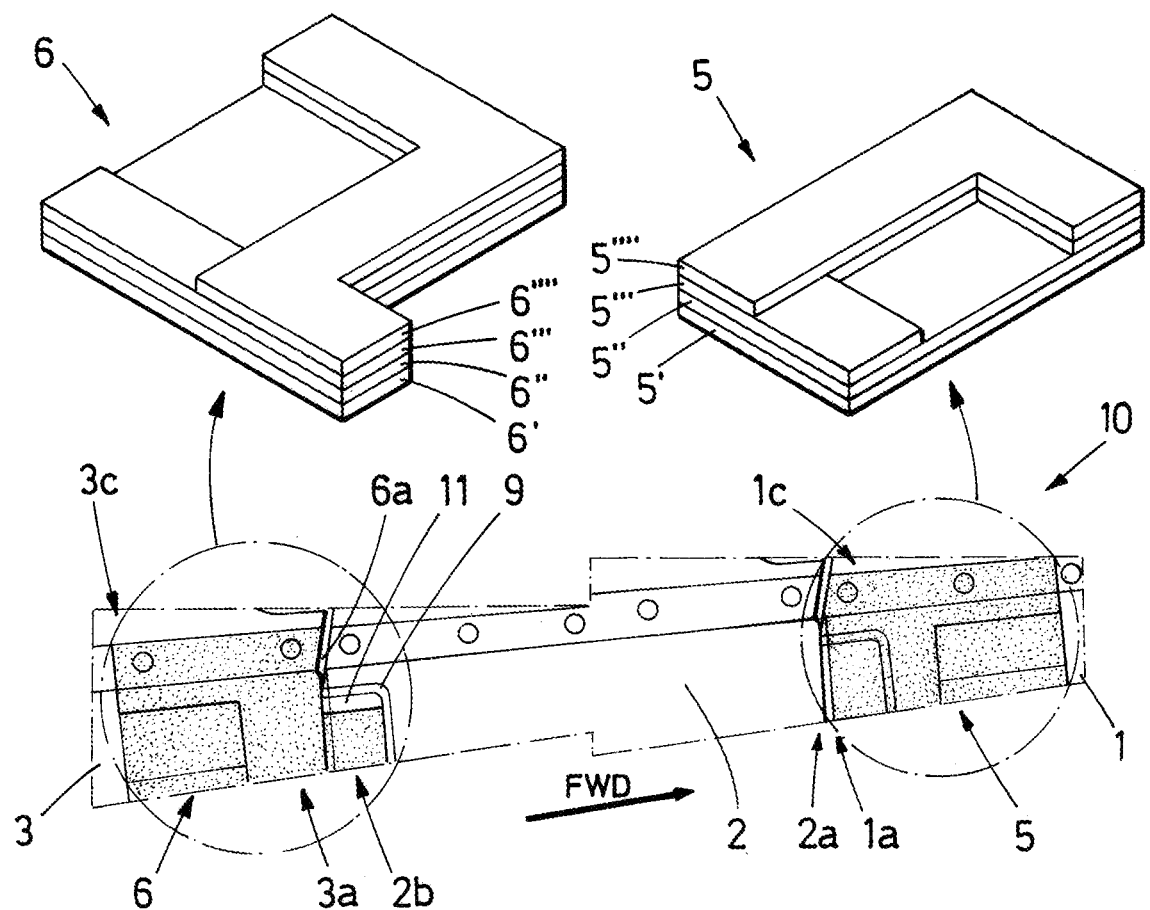
FIG. 4 shows a front perspective view of a composite panel assembly, according to a second embodiment of the present disclosure.

FIG. 4 shows a front perspective view of a second embodiment of a composite panel assembly 10. The composite panel assembly 10 comprises a first 1, second 2 and third panels 3, and a forward 5 and backward stack of plies 6.

The first and second panels 1, 2, and the forward stack of plies 5 are as already described, in which the lower face of the second panel 2 further comprises a recess 9 at a second side 2b of the panel 2, the second side 2b being opposite to the first side 2a of the panel 2.

The third aircraft panel 3 has upper and lower faces. The lower face has an outward projection 11 at a first side 3a of the panel 3. The outward projection 11 of the third panel 3 is received on the recess 9 of the second panel 2 forming a lower continuous face.

To reinforce the assembly between the second and third panels 2, 3 a rearward stack of plies 6 of composite material is bonded to the upper face of the second and third panels 2, 3.

Further, the number of plies of the rearward stack of plies 6 decreases toward the opposite side of the first side 3a of the third panel 3. This way, the number of plies dies progressively toward the middle section (second panel) to have a smooth structural and airflow transition.

As shown in FIG. 4 and according to another preferred embodiment, the forward stack of plies 5 comprises first and second plies 5', 5" of rectangular shape, a U-shaped third ply 5''' disposed on the second ply 5", and a L-shaped fourth ply 5'''' disposed on the third ply 5''', the third and fourth plies 5''', 5'''' covering at least part of the upper edge 1c of the first panel 1.

Further, as shown in FIG. 4 and according to another preferred embodiment, the rearward stack of plies 6 has an edge 6a overlapping the first side 3a of the third panel 3. Preferably, the rearward stack of plies 6 comprises first and second plies 6', 6" of rectangular shape, a third ply 6''' disposed on the second ply 6", and a fourth ply 6'''' disposed on the third ply 6''', the third and fourth plies 6''', 6'''' covering at least part of an area of the upper face of the second panel 2 correspondent to the assembly between the recess 9 of the second panel 2 and the outward projection 11 of the third panel 3.

Preferably, the third ply 6''' has a J-shaped configuration, and the fourth ply 6'''' has a Z-shaped configuration, and wherein the third and fourth plies 6''', 6'''' are disposed to cover at least part of the upper edge 3c of the third panel 3.

Plies are placed only locally at the extremity to compensate the free edge effect, and not to influence the overall stiffness of the seal (3 or 4 plies of local reinforcement).

Additionally, according to a preferred embodiment, the composite panel assembly 10 may further comprise an outer ply deposited on the panel assembly 10, embedding the stack of plies 5, 6 into the composite panel assembly.

According to another preferred embodiment, the stack of plies 5, 6 are extended to cover the riveting area of the panels 1, 2, 3, to thus avoiding the opening of the flange.

Further, according to another preferred embodiment, panels 1, 2, 3, are substantially made of silicone rubber, and the stacks of plies 5, 6 are substantially made of fiberglass.

Figure 5:
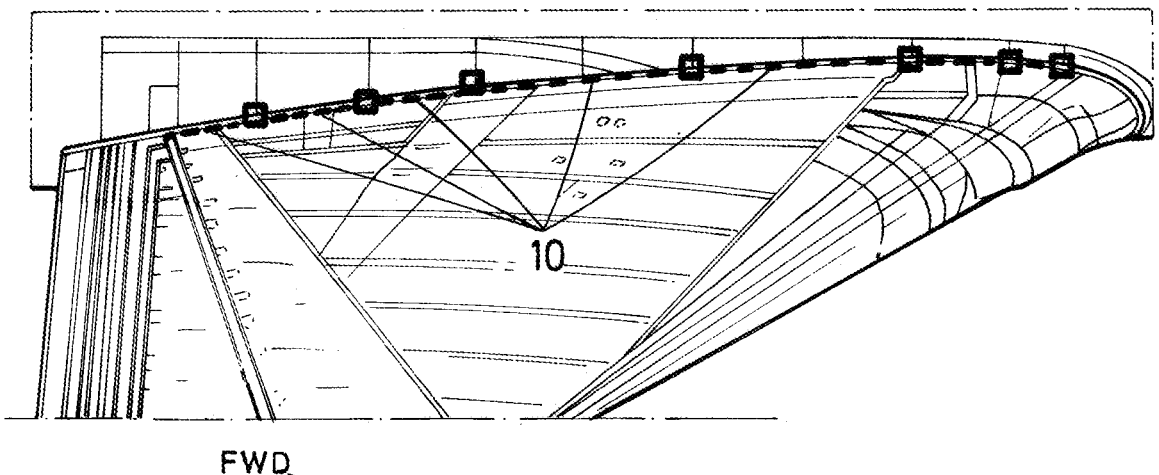
FIG. 5 shows a part of an aircraft, in particular, the interface between the wing and the fuselage, in which the composite panel assembly has been provided.

Finally, FIG. 5 shows a part of an aircraft, in which the interface between the upper side of the wing and the fuselage can be appreciated. As shown, a composite panel assembly 10 can be provided at the overwing seal.

While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims

The invention claimed is:

1. An aircraft composite panel assembly comprising:
a first panel having an upper face and lower face, the lower face having a recess on a first side of the panel;
a second panel having an upper face and lower face, the lower face having an outward projection at a first side of the panel, the outward projection received on the recess of the first panel forming a lower continuous face; and
a forward stack of plies of composite material bonded to the upper face of the first panel, the forward stack of plies having an edge that covers the first side of the first panel, and a number of plies of the forward stack of plies decreasing toward an opposite side of the first side of the first panel.

2. The aircraft composite panel assembly according to claim 1, wherein the lower face of the second panel has a recess at a second side opposite to the first side of the panel, and wherein the panel assembly further comprises a third panel having an upper face and lower face, the lower face having an outward projection at a first side of the panel, and wherein the outward projection is received on the recess of the second panel forming a lower continuous face.

3. The aircraft composite panel assembly according to claim 2, further comprising a rearward stack of plies of composite material bonded to the upper face of the second and third panels, wherein a number of plies of the rearward stack of plies decreases toward an opposite side of the first side of the third panel.

4. The aircraft composite panel assembly according to claim 3, wherein the rearward stack of plies has an edge that covers the first side of the third panel.

5. The aircraft composite panel assembly according to claim 3, wherein the rearward stack of plies comprises first and second plies of rectangular shape, a third ply disposed on the second ply, and a fourth ply disposed on the third ply, the third and fourth plies covering at least part of an area of the upper face of the second panel correspondent to the assembly between the recess of the second panel and the outward projection of the third panel.

6. The aircraft composite panel assembly according to claim 5, wherein the third ply has a J-shaped configuration, and the fourth ply has a Z-shaped configuration, and wherein the third and fourth plies are disposed to cover at least part of the upper edge of the third panel.

7. The aircraft composite panel assembly according to claim 1, further comprising an outer ply deposited on the panel assembly.

8. The aircraft composite panel assembly according to claim 1, wherein the forward stack of plies comprises first and second plies of rectangular shape, a U-shaped third ply disposed on the second ply, and a L-shaped fourth ply disposed on the third ply, the third and fourth plies covering at least part of an upper edge of the first panel.

9. An aircraft, comprising a landing gear door, a wing having a leading edge and a trailing edge, a horizontal tail plane having a leading edge and a trailing edge, a vertical tail plane having a leading edge and a trailing edge, a belly fairing, and a composite panel assembly,
the composite panel assembly comprising:
a first panel having an upper face and lower face, the lower face having a recess on a first side of the panel;
a second panel having an upper face and lower face, the lower face having an outward projection at a first side of the panel, the outward projection received on the recess of the first panel forming a lower continuous face; and a forward stack of plies of composite material bonded to the upper face of the first panel, the forward stack of plies having an edge that covers the first side of the first panel, and a number of plies of the forward stack of plies decreasing toward an opposite side of the first side of the first panel; and wherein at least part of the landing gear door, and/or the leading edge of the wing, and/or the trailing edge of the wing, and/or the leading edge of the horizontal tail plane, and/or the trailing edge of the horizontal tail plane, and/or the leading edge of the vertical tail plane, and/or the trailing edge of the vertical tail plane, and/or the belly fairing comprises the composite panel assembly.

10. A method for manufacturing a composite panel assembly for an aircraft, comprising:

providing a first panel having an upper face and lower face;

providing a recess on a first side of the lower face of the first panel;

providing a second panel having an upper face and lower face, the lower face having an outward projection at a first side of the panel;

providing a forward stack of plies of composite material, the forward stack of plies having an edge and a decreasing number of plies toward an opposite side of the edge;

bonding the forward stack of plies to the upper face of the first panel, such that the edge of the forward stack of plies covers the first side of the first panel; and coupling the outward projection of the second panel with the recess of the first panel forming a lower continuous face.

11. The method according to claim 10, further comprising:

providing a third panel having an upper face and lower face, the lower face having an outward projection at a first side of the panel;

providing a recess on the lower face of a second side opposite to the first side of the panel; and coupling the outward projection of the third panel with the recess of the second panel forming a lower continuous face.

12. The method according to claim 11, further comprising:

providing a rearward stack of plies of composite material, the rearward stack of plies having a decreasing number of plies toward one of its edges; and bonding the rearward stack of plies to the upper face of both the second and third panels, such that the number of plies decreases in a direction opposite to the second panel.

13. The method according to claim 12, wherein the rearward stack of plies comprises first and second plies of rectangular shape, a third ply disposed on the second ply, and a fourth ply disposed on the third ply, the third and fourth plies covering at least part of an area of the upper face of the second panel correspondent to the assembly between the recess of the second panel and the outward projection of the third panel.

14. The method according to claim 13, wherein the third ply has a J-shaped configuration, and the fourth ply has a Z-shaped configuration, and wherein the third and fourth plies are disposed covering at least part of the upper edge of the third panel.

15. The method according to claim 11, wherein the forward stack of plies comprises first and second plies of rectangular shape, a U-shaped third ply disposed on the second ply, and a L-shaped fourth ply disposed on the third ply, the third and fourth plies covering at least part of the upper edge of the first panel.

* * * * *